United States Patent [19]
Hartmann

[11] Patent Number: 5,693,229
[45] Date of Patent: Dec. 2, 1997

[54] PROCESS AND APPARATUS FOR THICKENING OF SOLID LIQUID MIXTURES BY MEANS OF MEMBRANE

[75] Inventor: Eduard Hartmann, Schneisingen, Switzerland

[73] Assignee: Bucher-Guyer AG Maschinenfabrik, Zurich, Switzerland

[21] Appl. No.: 495,448

[22] PCT Filed: Nov. 17, 1994

[86] PCT No.: PCT/CH94/00221

§ 371 Date: Jul. 26, 1995

§ 102(e) Date: Jul. 26, 1995

[87] PCT Pub. No.: WO95/15209

PCT Pub. Date: Jun. 8, 1995

[30] Foreign Application Priority Data

Mar. 12, 1993 [CH] Switzerland ............ 03 608/93

[51] Int. Cl.⁶ .................................................. B01D 6/00
[52] U.S. Cl. .................. 210/650; 210/641; 210/651; 210/195.2; 210/86; 210/87
[58] Field of Search ............... 210/650, 651, 210/195.2, 257.2, 87, 636, 641, 86; 426/490

[56] References Cited

U.S. PATENT DOCUMENTS

| | | | |
|---|---|---|---|
| 4,581,236 | 4/1986 | Bandel et al. | 210/650 |
| 4,659,483 | 4/1987 | Gries | 210/90 |
| 4,800,808 | 1/1989 | Lidmari | 210/650 |
| 4,897,465 | 1/1990 | Cordle et al. | 210/650 |
| 5,047,154 | 9/1991 | Comstuck et al. | 210/636 |
| 5,108,611 | 4/1992 | Chen et al. | 210/651 |
| 5,112,489 | 5/1992 | Hartmann | 210/257.2 |
| 5,171,767 | 12/1992 | Buckley et al. | 210/650 |
| 5,395,516 | 3/1995 | Gray | 210/87 |
| 5,401,523 | 3/1995 | Degene et al. | 210/651 |

*Primary Examiner*—Ana Fortuna
*Attorney, Agent, or Firm*—Burns, Doane, Swecker & Mathis, LLP

[57] ABSTRACT

To thicken retentate residues using ultra- or microfiltration to clarify fruit juices, apparatuses which have membrane modules (1, 2) are used in the cross-flow process with a retentate circuit. It is proposed that first, the process be carried out with virtually constant retentate overflow velocity at the membranes until there is an increased concentration. Then the transmembrane pressure of membrane modules (1, 2) is kept constant or further increased, and the overflow velocity is reduced, until the desired thickening of the retentate residue is achieved. So that the last reduction step can be carried out, speed-governed retentate displacement pumps (8) are employed. To prevent stoppages of the membranes of membrane modules (1, 2), the apparatus is operated with special flow dividers (10) for the retentate, or an individual circulating pump is associated with each group of membrane modules.

25 Claims, 5 Drawing Sheets

PROCESS AND APPARATUS FOR THICKENING OF SOLID LIQUID MIXTURES BY MEANS OF MEMBRANE

The invention relates to a process for thickening solid/fluid mixtures by means of membrane technology using an apparatus with membrane modules having a retentate circuit, as well as to a device for carrying out this process.

At this time, there are no known special apparatuses for the thickening of retentates which are produced in ultrafiltration or microfiltration. When clarifying fruit juices by means of filtration technologies of this kind, thickening states of up to approximately 50 vol % wet pulp content are achieved in the retentate residues, measured in the centrifuge test. That is, in the centrifuge these residues still give off at least 50 vol % of fluid. Retentates of this kind are still fluid and must be further processed especially for disposal by means of vacuum rotary filters.

Vacuum rotary filters are precoated filters, and for filtration they require diatomaceous earth, which has to be procured and then disposed of once again. Disposing of retentate via the sewer is hardly possible anymore, and so the retentate must be thickened and put in a waste dump or incinerated. In both cases, the lowest possible water content in the retentate is truly very significant economically. Only membrane apparatuses which are especially equipped for this purpose seem practical, if further thickening of the residue over and above the 50 vol % mentioned is to be attained. Similar problems also occur in other uses of membrane technology outside the realm of fruit juice.

The JOURNAL OF FOOD SCIENCE, Vol. 51, No. 3, 1986, pp. 559–563 discloses an apparatus, which has metal membrane ultrafiltration with a single pass, for improved apple juice production yield. Juice production yields of up to 85% were reached with it, but apparatuses of this kind with single passes do not seem practical for a thickening of retentates on a large scale.

The object of the invention, therefore, is to indicate a process for thickening solid/fluid mixtures by means of membrane technology and a device to carry it out.

According to the invention, by using an apparatus with membrane modules having a retentate circuit, this object is attained in that the retentate feed stream in the membrane modules is kept virtually constant in a first step with a membrane apparatus, which is operated in the batch mode, or quasi-continually, until as a result of the thickening process of the retentate, the inflow pressure into the membrane modules exceeds a predetermined desired value; in that in a second step, the inflow pressure is kept constant by reducing the retentate feed stream until a desired value of thickening of the retentate is achieved; and in that in a third step, the thickened retentate is removed from the circuit.

An apparatus for carrying out this process is distinguished by at least one volumetrically feeding pump in the retentate circuit, which pump is equipped with a device for changing the feed capacity.

Further characteristics and advantageous embodiments of the invention can be inferred from the claims.

BRIEF DESCRIPTION OF DRAWINGS

Exemplary embodiments of the invention are explained in the following description and in the drawing figures. Shown are.

DETAILED DESCRIPTION

Figure 1:
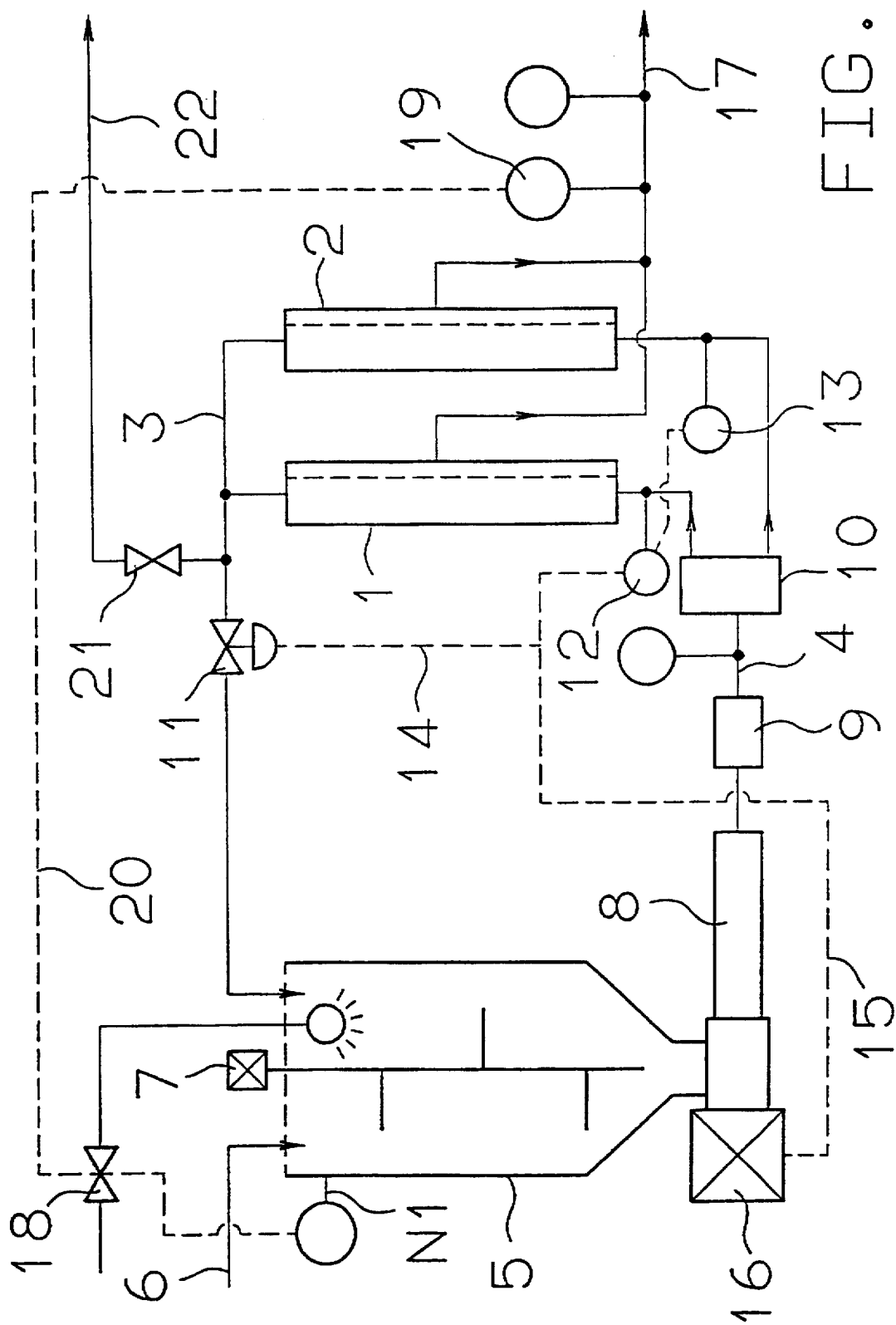
FIG. 1, a schematic representation of a multi-step thickening apparatus according to the invention, with a flow divider, FIG. 2, a schematic representation of a multi-step thickening apparatus according to the invention, with a plurality of pumps for retentate recirculation, FIG. 3, a schematic representation of a multi-step thickening apparatus according to the invention, for products with coarse solid contents, FIG. 4, a schematic representation of a single-step thickening apparatus according to the invention, FIG. 5, a schematic representation of a single-step thickening apparatus according to the invention for quasi-continual operation, having a closed retentate circuit without a batch vessel, and FIG. 5a, a time diagram of the retentate outflow F4 and of the product inflow F1 in an apparatus according to FIG. 5.

FIG. 1 schematically represents two filtration module passes 1 and 2. Each module pass includes a plurality of diafiltration modules in series, and each filtration module is comprised of one or a plurality of tubes, whose walls are embodied as filter membranes. Module passes of this type are known and are not shown here in detail. Both module passes 1, 2 are connected in a retentate circuit by lines 3, 4 to a vessel 5 for the raw product to be thickened. The raw product is supplied into the vessel 5 via a line 6, which raw product is advantageously already prefiltered and, in the case of fruit juices, is thickened to about 40–70% wet pulp content.

The vessel 5 has an agitating device 7 and is connected to a feed pump 8, which supplies the raw product via a homogenizer 9, the line 4, and a flow divider 10 to the retentate inlets of module passes 1 and 2. The flow divider 10 attains the object, even when there are unequal inflow pressures P1 and P2 at the modules of passes 1, 2, of ensuring that the quantities flowing to the module passes are as equal as possible. On both outlets of the module passes 1, 2, the two partial streams of retentate are reunified with the return line 3, and the retentate flows back into the vessel 5 by means of a controlled valve 11.

As soon as the raw product reaches a minimum level N2 in the vessel 5, the feed pump 8 starts up. In a startup phase, the retentate is supplied to the modules of passes 1, 2 with a feed stream, which is constant up to standard tolerances. The transmembrane pressure required for the filtration is predetermined as the desired value for the inflow pressures P1, P2. These inflow pressures are detected by sensors 12, 13 at the passes 1, 2 and transmitted via signal lines 14, 15 to the controlled valve 11 and the motor 16 of the feed pump 8. Thus the transmembrane pressure is kept constant by adjusting the controlled valve 11. The raw product is furthermore supplied into the vessel 5 in such a way that a working level N1, which is over the minimum level N2 mentioned, is reached and then kept constant.

As a result of the transmembrane pressure, permeate discharges from the passes 1, 2 via a line 17 and the concentration of those portions that do not pass the membranes of passes 1, 2, increases in the retentate circuit 1, 2, 3, 4, 5. That is why the viscosity of the retentate rises and the pressures P1, P2 increase in the course of the flow through the modules of passes 1, 2. As a result, the controlled valve 11 is opened further via the signal line 14. As soon as the entire regulating cross section of the valve 11 is unblocked, the pressures P1, P2 increase more steeply. If P1 and P2 have reached a desired value, then the supply of raw product via the line 6 is stopped and a rinsing fluid is supplied to the vessel 5 via a valve 18 so that the working level N1 remains constant.

Water, alcohol, or other solvents can be used as the rinsing fluid. The retentate is now rinsed, and on the permeate side, the concentration of matter dissolved in the permeate declines. If this involves dissolved solids, their proportional content can be measured via a Brix measurement. In other cases, other measuring devices can also be used here to measure other quantities, such as pH value, viscosity, color, electrical conductivity, etc.

As soon as a predetermined desired value in the permeate is no longer attained, the rinsing process ends and the inlet valve 18 closes. For this, in the exemplary embodiment shown, a Brix sensor 19 is provided on the output line 17, whose output signal is supplied to the inlet valve 18 via a signal line 20. Since the supply of raw product remains likewise interrupted, the concentration of matter retained by the membranes of the passes 1, 2 increases in the retentate circuit. This effects a further increase of the viscosity and, when the flow is constant, effects a further increase of the inflow pressures P1, P2 in the passes 1, 2.

The latter-mentioned further increases, though, are now prevented, specifically by reducing the flow per unit of time so that P1 and P2 remain constant. In the event that an eccentric worm pump is employed as the feed pump 8, the worm speed is simply reduced with increasing viscosity.

As soon as the flow rate drops below a predetermined minimal desired value, or the desired thickening of the retentate is reached, the retentate is expelled from the apparatus. This takes place via a valve 21 in an outlet line 22; the controlled valve 11 closes. The expulsion process is ended as soon as the minimum level N2 is reached in the vessel 5.

Next, fresh raw product is fed into the vessel 5 again via the line 6 and the controlled valve 11 is opened, the outlet valve 21 is closed, and the level in the vessel 5 is set to its working level N1. Because of the specifications with respect to regulating the inflow pressures P1, P2 of passes 1, 2, the capacity of the feed pump 8 is increased once again to its initial desired value, and the controlled valve 11 reassumes the regulating function for the pressures P1, P2. The thickening process described up to this point is carried out once or several times until the raw product to be thickened is processed or until a chemical cleaning of the membranes of passes 1, 2 is required due to sharply decreasing membrane performance.

If the raw product to be thickened is processed, the filtration procedure is ended by a rinsing process. To that end, immediately after the last of the above mentioned expulsion processes, water or another similarly-acting fluid is supplied to the vessel 5 via the inlet valve 18 and at the same time the controlled valve 11 is opened and the outlet valve 21 is closed. If doing this achieves the working level N1 in the vessel 5, then on the contrary, the outlet valve 21 is reopened, the controlled valve 11 is closed, and the rinsed out retentate, which is mixed with water, is expelled. This process can be repeated as often as necessary until nearly all of the matter retained in the retentate is expelled from the filter membranes.

In the rinsing and retentate displacement process, the agitating device 7 in the vessel 5, in connection with the homogenizer 9, has the function of distributing the supplied water as homogeneously as possible in the retentate. This serves the objective of achieving a better rinsing effect as well as a perfect displacement of the highly viscous retentate from the filtration modules of passes 1, 2. Since in these modules a multitude of membrane tubes usually experience a simultaneous oncoming parallel flow, undissolved, highly viscous retentate residues lead to flow interruptions, blocking of passages, and stoppages in the tubes.

Figure 2:
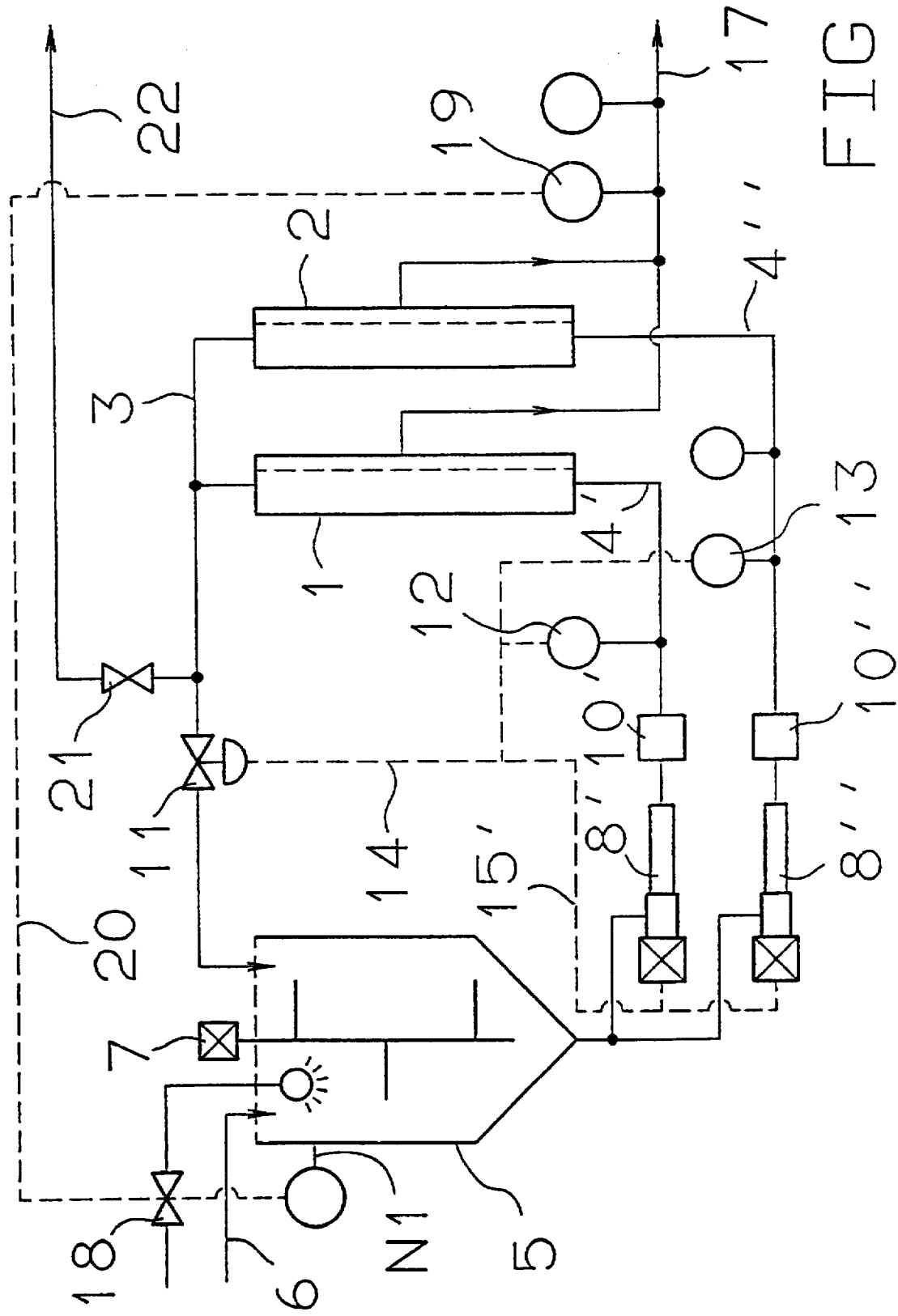

With the apparatus described so far in FIG. 1, when processing fruit juices, even in multi-conduit modules and multi-pass apparatuses, it is possible to achieve a retentate thickening with 100% wet pulp content in the centrifuge test. In the apparatus schematically represented in FIG. 2, already explained reference numerals indicate components having the same functions as in FIG. 1. In FIG. 2, though, a flow divider 10 is no longer necessary. Instead, an individual feed pump 8', 8" is provided for each passe 1, 2. These two pumps always run in the same operational states, which are produced by means of a common control line 15'. With them, two homogenizers 10', 10" in the retentate supply lines 4', 4" are also required.

Figure 3:
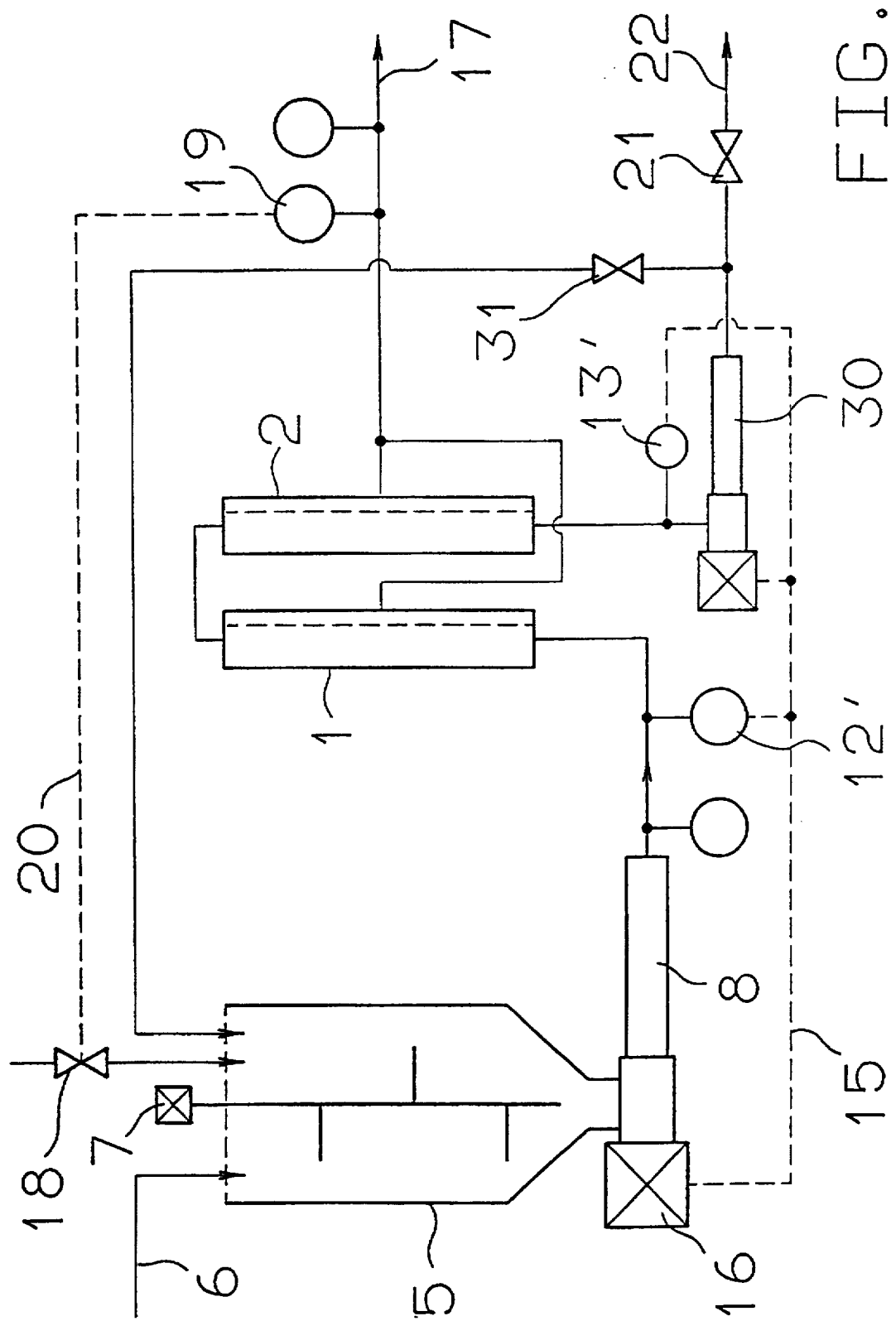

In the apparatus schematically represented in FIG. 3, already mentioned reference numerals also indicate components with the already explained functions. In FIG. 3, though, in lieu of the controlled valve 11, an eccentric worm pump 30 is employed, which pumps out from the pressure zone of passes 1, 2. Pump 30 can be smoothly adjusted just like the feed pump 8 in the feed stream. With this apparatus, the thickening process is carried out analogous to the one described in FIG. 1. However, omitting the controlled valve 11 here allows it to also extract juice from mashes, which clog valves 11, but do not interfere with the function of pump 30. A stop valve 31 is required for the thickening and rinsing.

Like the apparatuses according to FIGS. 1 and 2, the one according to FIG. 3 also operates in the batch mode. In comparison with the apparatus with metal membrane ultrafiltration, which was mentioned at the beginning and which is known from the JOURNAL OF FOOD AND SCIENCE, 1986, has the advantage that only a low number of modules is required in the passes 1, 2, and that their transmembrane pressures can be kept low. Compared to the apparatuses according to FIGS. 1 and 2, the one according to FIG. 3 offers the advantage that coarse pieces of solid matter that might be present in the retentate will not pass through any regulating valve, which they could clog. Here, even products in the fruit juice or foodstuffs region, which are difficult to press, or which cannot be pressed at all, can have juice extracted from them and be thickened.

Figure 4:
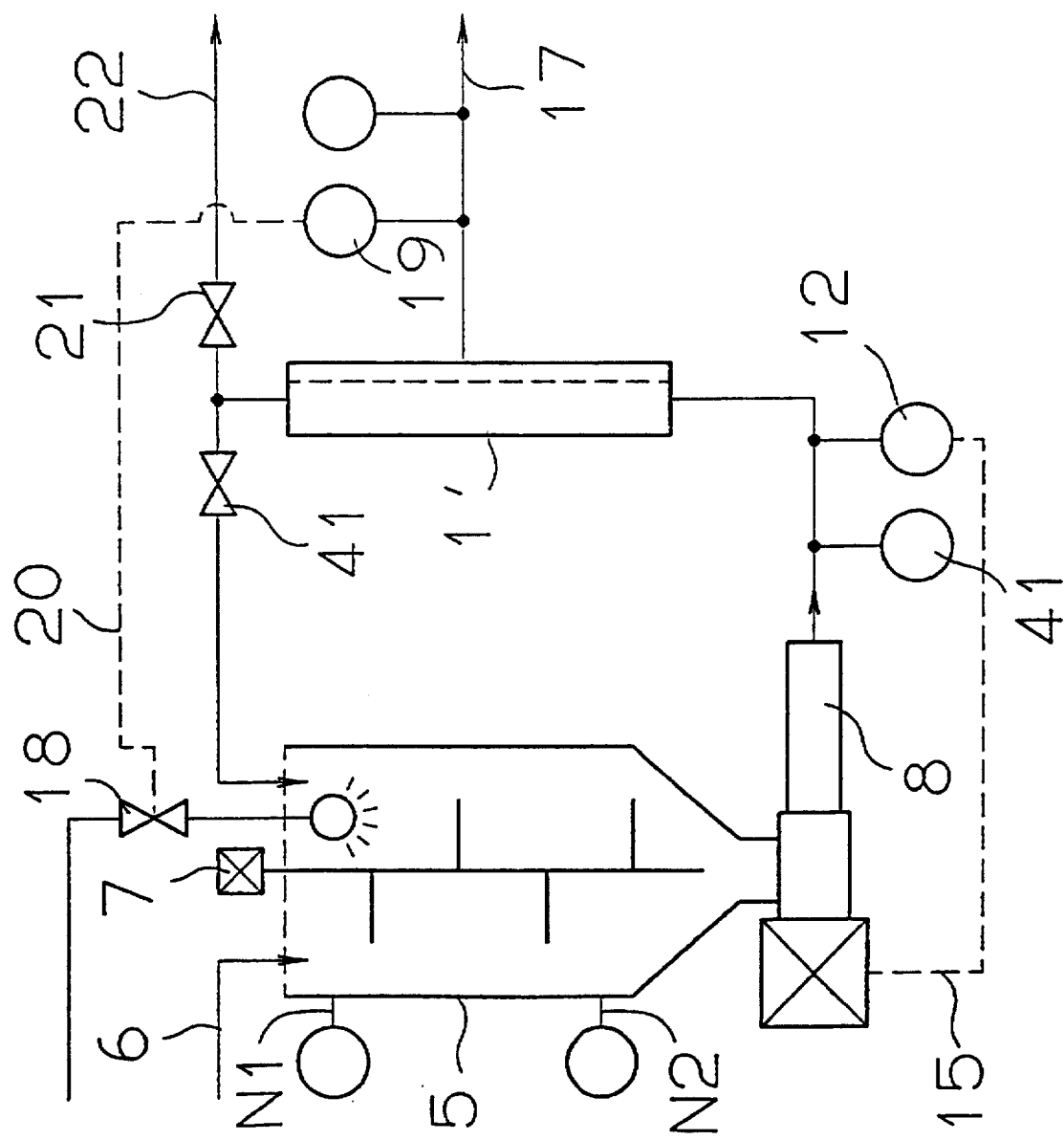

FIG. 4 also shows an apparatus in which a controlled valve 11 is omitted, which controls the flow of retentate at the module outputs of passes 1, 2. The predetermined operating pressure P1 of the only pass 1' is detected by the sensor 12 and achieved by means of increasing or reducing the flow capacity of the feed pump 8 via the control line 15. The rinsing process is initiated when the retentate flow drops below a minimal capacity F1, which is predetermined as a desired value. The flow F1 is detected by a sensor 41 on the capacity of feed pump 8. The initiation of the retentate expulsion process is carried out analogous to the way already described in FIG. 1, by means of valves 21 and 41. Low manufacture costs and less expense for regulation are advantages of the apparatus described in FIG. 4.

Figure 5A:
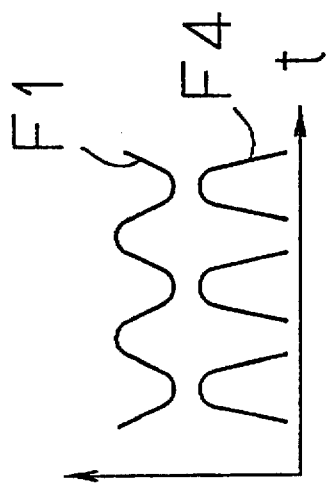
Figure 5:
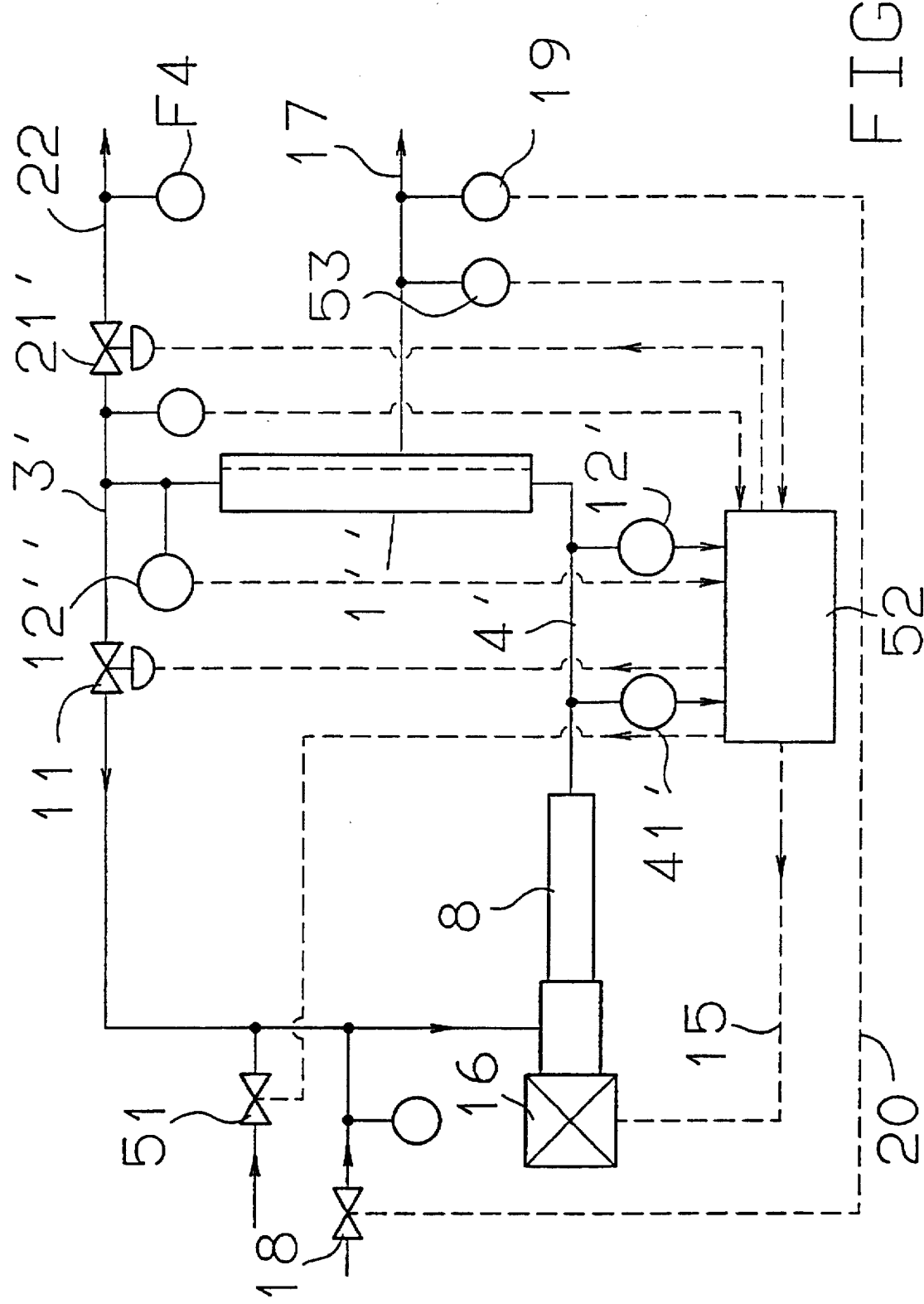

FIG. 5 shows a variant of the already described apparatuses, in which a form which is closed to the outside air is achieved by omitting an initial vessel 5. The control of the functional courses is carried out centrally here via a processor 52, to which the working pressures P1, P2 of the retentate at the inlet and outlet of pass 1", which pressures are detected by sensors 12', 12", and the through flows of retentate from a sensor 41' and permeate from a sensor 53 are supplied. The processor 52, for its part, generates control signals for the control of the motor 16 of the feed pump 8 via the line 15, of the controlled valve 11, and of a retentate outlet valve 21'.

With the apparatus according to FIG. 5, it is possible to operate continually or quasi-continually, with retentate displacement at intervals. As shown in the time diagram in FIG. 5a, this retentate displacement is carried out with repeating peaks of the retentate outflow F4 at the line 22 whenever the product inflow F1 from pump 8 drops sharply. An advantage of this variant lies in the slightly oxidative burden of the retentate resulting from the ambient air. This property is also supported by carrying out the process with inert gas or by preventing losses of volatile rinsing agents such as alcohol, etc.

I claim:

1. A process for thickening solid/fluid mixtures by way of membrane technology using an apparatus that includes membrane modules and a retentate circuit for circulating retentate, the retentate circuit including a retentate feed stream which is fed to the membrane modules, the process comprising, a first step of maintaining the retentate feed stream in the membrane modules virtually constant until an inflow pressure of the retentate feed stream flowing into the membrane modules exceeds a predetermined desired value due to thickening of the retentate, a second step of reducing the retentate feed stream to keep the inflow pressure substantially constant until a desired value of thickening of the retentate is reached, and a third step of removing the thickened retentate from the retentate circuit.

2. The process according to claim 1, wherein the membrane apparatus is operated in a cross-flow process.

3. The process according to claim 1, wherein the thickening of the retentate is determined based on flow of the retentate in the retentate circuit.

4. The process according to claim 1, wherein during at least a portion of the first step, the inflow pressure of the retentate feed stream into the membrane modules is kept constant, and outflow of retentate from the membrane modules is controlled with a throttle device to control pressure differentials.

5. The process according to claim 1, including supplying before the second or third step a rinsing fluid to the retentate feed stream until permeate discharged from the membrane modules drops below a predetermined Brix value.

6. A process for thickening solid/fluid mixtures by way of membrane technology using an apparatus that includes membrane modules and a retentate circuit for circulating retentate, the retentate circuit including a retentate feed stream which is fed to the membrane modules, the process comprising, a first step of increasing the retentate feed stream in the retentate circuit until an inflow pressure of the retentate feed stream into the membrane modules reaches a predetermined desired value, and a second step of maintaining the inflow pressure into the membrane modules substantially constant by regulating the retentate feed stream until the retentate feed stream is reduced to a level which corresponds to a desired value of thickening of the retentate.

7. Apparatus for thickening solid/fluid mixtures by way of membrane technology, comprising membrane modules for filtering a retentate, a retentate circuit for circulating retentate into and out of the membrane modules, at least one volumetrical feeding pump located in the retentate circuit for pumping retentate into the membrane modules, said pump being equipped with a device for changing the feed capacity of the feeding pump.

8. Apparatus according to claim 7, wherein the feeding pump in the retentate circuit is equipped with an electronic speed governor.

9. Apparatus according to claim 7, wherein the feeding pump in the retentate circuit is an eccentric worm pump.

10. Apparatus according to claim 7, wherein the feeding pump in the retentate circuit is a membrane pump.

11. Apparatus according to claim 10, wherein the membrane pump is a pneumatically driven pump.

12. Apparatus according to claim 7, wherein the membrane modules are disposed in a plurality of module passes, each of the module passes including a plurality of membrane modules in series, the module passes being connected to a common retentate circuit, and including a flow divider disposed in the common retentate circuit between the feeding pump and the module passes.

13. Apparatus according to claim 12, wherein the flow divider is a static flow divider without moving parts.

14. Apparatus according to claim 12, wherein the flow divider is a dynamic flow divider.

15. Apparatus according to claim 7, including a vessel for receiving the solid/fluid mixture, the vessel being positioned directly before the feeding pump.

16. Apparatus according to claim 15, including a line shorter than three meters in length which connects the feeding pump in the retentate circuit to the vessel.

17. Apparatus according to claim 15, wherein the vessel for the solid/fluid mixture has an agitator.

18. Apparatus according to claim 7, including a homogenizer disposed in the retentate circuit, said homogenizer being disposed downstream of the feeding pump with respect to the direction of flow of the retentate and being located between the feeding pump and the membrane modules.

19. Apparatus according to claim 7, including a throttle device disposed in the retentate circuit, said throttle device being disposed downstream of the membrane modules with respect to the direction of flow of the retentate and being located upstream of the feeding pump with respect to the direction of flow of the retentate.

20. Apparatus according to claim 19, wherein the throttle device a servo-regulating valve.

21. Apparatus according to claim 19, wherein the throttle device a variable-flow volumetric pump.

22. Apparatus according to claim 19, wherein the throttle device is an eccentric worm pump.

23. Apparatus according to claim 7, wherein the membrane modules are disposed in at least one module pass which includes a plurality of membrane modules in series, the at least one module pass being provided with a pressure measuring device on an inlet side of the at least one module pass for producing pressure measurement signals that are supplied electrically or pneumatically to a throttle device in the retentate circuit and to the feeding pump.

24. Apparatus according to claim 7, wherein the membrane modules are disposed in at least one module pass which includes a plurality of membrane modules in series, the at least one module pass including a permeate outflow through which permeate flows from the at least one module pass, a Brix measuring device connected to the permeate outflow for producing measurement signals that are supplied electrically to a water inlet valve which supplies water to the retentate circuit.

25. Apparatus according to claim 7, wherein the membrane modules are disposed in at least one module pass which includes a plurality of membrane modules in series, the retentate circuit including a retentate line located after the at least one module pass in the direction of flow of the retentate, the retentate line being divided into two branches, one of the branches being connected to a throttle device and the other branch being connected to an output valve for removing the retentate.

* * * * *